United States Patent
Nagaraja et al.

(10) Patent No.: US 11,382,007 B2
(45) Date of Patent: *Jul. 5, 2022

(54) UE SELECTION OF CONTENTION-FREE AND CONTENTION-BASED RANDOM ACCESS FOR HANDOVER

(71) Applicant: QUALCOMM Incorporated, San Diego, CA (US)

(72) Inventors: Sumeeth Nagaraja, Los Altos, CA (US); Tao Luo, San Diego, CA (US); Makesh Pravin John Wilson, San Diego, CA (US); Sony Akkarakaran, Poway, CA (US); Juan Montojo, San Diego, CA (US); Shengbo Chen, San Diego, CA (US); Wooseok Nam, San Diego, CA (US); Xiao Feng Wang, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/851,856

(22) Filed: Apr. 17, 2020

(65) Prior Publication Data

US 2020/0245198 A1    Jul. 30, 2020

Related U.S. Application Data

(63) Continuation of application No. 15/970,554, filed on May 3, 2018, now Pat. No. 10,638,378.

(Continued)

(51) Int. Cl.
*H04W 36/00* (2009.01)
*H04W 74/00* (2009.01)
(Continued)

(52) U.S. Cl.
CPC ... *H04W 36/0044* (2013.01); *H04W 36/0077* (2013.01); *H04W 74/008* (2013.01);
(Continued)

(58) Field of Classification Search
CPC ............ H04W 36/0079; H04W 36/08; H04W 56/0045; H04W 72/1226; H04W 74/004;
(Continued)

(56) References Cited

U.S. PATENT DOCUMENTS 8,031,668 B2   10/2011   Wang et al.
8,098,628 B2   1/2012    Abeta et al.
(Continued)

FOREIGN PATENT DOCUMENTS

CN    101400129 A    4/2009
CN    105992191 A    10/2016
(Continued)

OTHER PUBLICATIONS

3GPP TS 38.321, "3rd Generation Partnership Project, Technical Specification Group Radio Access Network, NR, Medium Access Control (MAC) Protocol Specification (Release 15)", 3GPP TS 38.321, V15.1.0, Mar. 2018, 3rd Generation Partnership Project (3GPP), Mobile Competence Centre, 650, Route Des Lucioles, F-06921 Sophia-Antipolis Cedex, France, vol. RAN WG2, No. V15.1.0, Apr. 2, 2018 (Apr. 2, 2018), XP051450732, pp. 1-67, [retrieved on Apr. 2, 2018] Par. 5.3.2, Par. 5.4.2, Par. 5.15.

(Continued)

*Primary Examiner* — Eric Nowlin
(74) *Attorney, Agent, or Firm* — Qualcomm Incorporated

(57) ABSTRACT

This disclosure generally relates to systems, devices, apparatuses, products, and methods for wireless communication. A communication system may include a user equipment (UE) that receives a configuration for contention-free random access (CFRA) and a configuration for contention- (Continued)

based random access (CBRA). The UE determines a first random access resource. The first random access resource maps to one or more beams from a target base station. The UE determines a beam quality associated with the first random access resource. The UE initiates a random access request using the CFRA when the first random access resource is a contention-free resource, and the beam quality of the first random access resource is above a threshold beam quality. The UE initiates the random access request using the CBRA when the first random access resource is the contention-free resource, and the beam quality of the first random access resource is below the threshold beam quality.

21 Claims, 8 Drawing Sheets

Related U.S. Application Data

(60) Provisional application No. 62/502,159, filed on May 5, 2017.

(51) Int. Cl.
  *H04W 74/08* (2009.01)
  *H04W 74/02* (2009.01)
  *H04W 36/08* (2009.01)
  *H04W 74/04* (2009.01)

(52) U.S. Cl.
  CPC ........ *H04W 74/0833* (2013.01); *H04W 36/08* (2013.01); *H04W 74/006* (2013.01); *H04W 74/02* (2013.01); *H04W 74/04* (2013.01)

(58) Field of Classification Search
  CPC ........... H04W 74/006; H04W 74/0077; H04W 74/0833; H04W 74/085
  See application file for complete search history.

(56) References Cited

U.S. PATENT DOCUMENTS

| | | | |
|---|---|---|---|
| 9,603,048 B2 | 3/2017 | Pelletier et al. | |
| 9,730,249 B2 | 8/2017 | Jha et al. | |
| 9,848,434 B2* | 12/2017 | Zhao | H04W 72/10 |
| 10,638,378 B2 | 4/2020 | Nagaraja et al. | |
| 10,700,752 B2* | 6/2020 | Jung | H04W 74/006 |
| 2007/0060155 A1* | 3/2007 | Kahana | H04W 72/085 |
| | | | 455/450 |
| 2009/0186624 A1 | 7/2009 | Cave et al. | |
| 2010/0254351 A1 | 10/2010 | Wang et al. | |
| 2012/0281566 A1 | 11/2012 | Pelletier et al. | |
| 2014/0045520 A1 | 2/2014 | Lim et al. | |
| 2014/0146790 A1 | 5/2014 | Zhang et al. | |
| 2014/0169336 A1 | 6/2014 | Oh et al. | |
| 2014/0362794 A1 | 12/2014 | Zhao et al. | |
| 2016/0057783 A1 | 2/2016 | Rosa et al. | |
| 2016/0165522 A1 | 6/2016 | Zhang et al. | |
| 2016/0174124 A1 | 6/2016 | Basu Mallick et al. | |
| 2016/0174237 A1 | 6/2016 | Zhao et al. | |
| 2016/0270053 A1 | 9/2016 | Zeng et al. | |
| 2016/0330766 A1 | 11/2016 | Liu et al. | |
| 2017/0006593 A1 | 1/2017 | Liu | |
| 2017/0078933 A1 | 3/2017 | Li et al. | |
| 2017/0086106 A1 | 3/2017 | Yiu et al. | |
| 2017/0231011 A1 | 8/2017 | Park et al. | |
| 2017/0251460 A1 | 8/2017 | Agiwal et al. | |
| 2017/0257898 A1 | 9/2017 | Maaref | |
| 2017/0367058 A1 | 12/2017 | Pelletier et al. | |
| 2018/0049238 A1 | 2/2018 | Frenne et al. | |
| 2018/0199332 A1 | 7/2018 | Islam et al. | |
| 2018/0227819 A1 | 8/2018 | Lee et al. | |
| 2018/0332515 A1 | 11/2018 | Au et al. | |
| 2018/0343595 A1 | 11/2018 | Da Silva et al. | |
| 2019/0007993 A1 | 1/2019 | Bergquist et al. | |
| 2019/0052334 A1 | 2/2019 | Jeon et al. | |
| 2019/0053120 A1 | 2/2019 | Park et al. | |
| 2019/0053272 A1 | 2/2019 | Tsai | |
| 2019/0069258 A1 | 2/2019 | Jeon et al. | |
| 2019/0075498 A1 | 3/2019 | Yiu et al. | |
| 2019/0110300 A1 | 4/2019 | Chen et al. | |
| 2019/0124707 A1 | 4/2019 | Wang et al. | |
| 2019/0141592 A1 | 5/2019 | Park et al. | |
| 2019/0141783 A1 | 5/2019 | Malik et al. | |
| 2019/0149421 A1 | 5/2019 | Jin et al. | |
| 2019/0159135 A1 | 5/2019 | Molavianjazi et al. | |
| 2019/0159136 A1 | 5/2019 | Molavianjazi et al. | |
| 2019/0159261 A1 | 5/2019 | Jung et al. | |
| 2019/0182682 A1 | 6/2019 | Kim et al. | |
| 2019/0200248 A1 | 6/2019 | Basu Mallick et al. | |
| 2019/0215220 A1 | 7/2019 | Islam et al. | |
| 2019/0297537 A1 | 9/2019 | Tsai et al. | |
| 2019/0313264 A1 | 10/2019 | Lin | |
| 2019/0313391 A1 | 10/2019 | Lin | |
| 2019/0357063 A1 | 11/2019 | Lee et al. | |
| 2020/0351828 A1 | 11/2020 | Lee et al. | |

FOREIGN PATENT DOCUMENTS

| | | | | |
|---|---|---|---|---|
| EP | 3028521 B1 * | 9/2018 | ............ | H04W 72/10 |
| EP | 3537835 A1 | 9/2019 | | |
| EP | 3550905 A1 | 10/2019 | | |
| KR | 20140072968 A | 6/2014 | | |
| WO | 2012155234 A1 | 11/2012 | | |
| WO | 2013025026 A3 | 4/2013 | | |
| WO | 2015016754 A1 | 2/2015 | | |
| WO | WO-2015016754 A1 * | 2/2015 | ............ | H04W 72/10 |
| WO | 2015147717 A1 | 10/2015 | | |
| WO | 2019004893 A1 | 1/2019 | | |
| WO | 2019022572 A1 | 1/2019 | | |
| WO | 2019084229 A1 | 4/2019 | | |
| WO | 2020173536 A1 | 9/2020 | | |

OTHER PUBLICATIONS

International Search Report and Written Opinion—PCT/CN2017/105276—ISA/EPO—dated Feb. 1, 2018.
International Search Report and Written Opinion—PCT/US2018/031059—ISA/EPO—dated Oct. 26, 2018.
NTT Docomo Inc: "Discussion on 4-step Random Access Procedure for NR", R1-1705712, 3GPP TSG RAN WG1 Meeting #88bis, Apr. 7, 2017, 8 pages.
Taiwan Search Report—TW107115236—TIPO—dated Aug. 13, 2021.
CATT: "Beam and NR HO [online]", 3GPP TSG RAN WG2 # 97bis, R2-1703097, Spokane, USA, Apr. 3-7, 2017, Internet URL: https://www.3gpp.org/ftp/tsg_ran/WG2_RL2/TSGR2_97bis/Docs/R2-1703097.zip, pp. 1-4.
ETSI MCC: "Report of 3GPP TSG RAN2 Meeting #97bis Spokane, USA", 3GPP TSG-RAN WG2 meeting #98, R2-1704001, Hangzhou, China, May 15-19, 2017, 173 Pages, URL: https://www.3gpp.org/ftp/TSG_RAN/WG2_RL2/TSGR2_98/Docs/R2-1704001.zip.

* cited by examiner

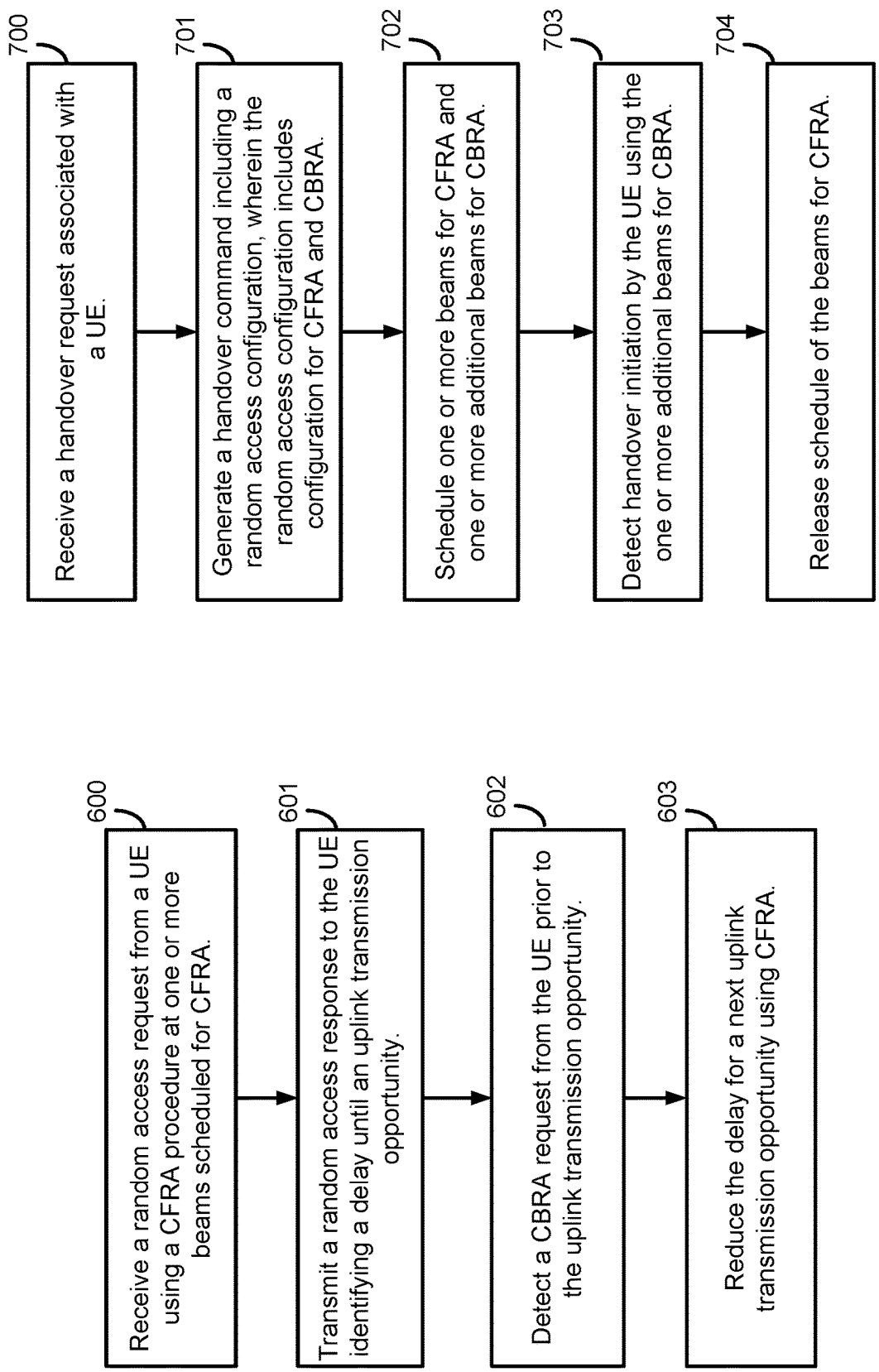

UE SELECTION OF CONTENTION-FREE AND CONTENTION-BASED RANDOM ACCESS FOR HANDOVER

CROSS-REFERENCE TO RELATED APPLICATIONS

This application is a continuation of U.S. patent application Ser. No. 15/970,554, filed on May 3, 2018, which claims the benefit of U.S. Provisional Patent Application No. 62/502,159, filed on May 5, 2017, both of which are expressly incorporated by reference herein.

BACKGROUND

Field

Aspects of the present disclosure relate generally to wireless communication systems, and more particularly, to user equipment (UE) selection of contention-free random access (CFRA) and contention-based random access (CBRA) for handover processing.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a UE, a random access configuration, wherein the random access configuration includes configuration for contention-free random access (CFRA) and contention-based random access (CBRA), determining, at the UE, a first random access resource, wherein the first random access resource maps to one or more beams from a target base station, determining, by the UE, a beam quality associated with the first random access resource, and initiating, by the UE, a random access request using the CBRA when the first random access resource is a contention-free resource, and the beam quality of the first random access resource is below a threshold beam quality.

In an additional aspect of the disclosure, a method of wireless communication includes receiving, at a UE, a random access configuration, wherein the random access configuration includes configuration for CFRA and CBRA, determining, at the UE, a first random access resource, wherein the first random access resource maps to one or more beams from a target base station, initiating, by the UE, a random access request using the CFRA when the first random access resource is a contention-free resource, failing, by the UE, to detect a random access response to the random access request using the CFRA prior to a predetermined period of time after the initiating the random access using the CFRA, and initiating, by the UE, CBRA at a next contention-based resource, wherein the next contention-based resource maps to one or more additional beams of the target base station.

In an additional aspect of the disclosure, a method of wireless communication includes receiving, at a UE, a random access configuration, wherein the random access configuration includes configuration for CFRA and CBRA, detecting, at the UE, a first random access resource, wherein the first random access resource maps to one or more beams from a target base station, initiating, by the UE, a random access request using the CFRA when the first random access resource is a contention-free resource, and initiating, by the UE, the random access request using the CBRA when the first random access resource is a contention-based resource.

In an additional aspect of the disclosure, a method of wireless communication includes receiving, at a target base station, a random access request from a UE using a CFRA procedure at one or more beams scheduled for CFRA, transmitting, by the target base station, a random access response to the UE identifying a delay until an uplink transmission opportunity, detecting, by the target base station, a CBRA request from the UE prior to the uplink transmission opportunity, and reducing, by the target base station, the delay for a next uplink transmission opportunity using CFRA.

In an additional aspect of the disclosure, a method of wireless communication includes receiving, at a target base station, a handover request associated with a UE, generating, by the target base station, a handover command including a random access configuration, wherein the random access configuration includes configuration for CFRA and CBRA, scheduling, by the target base station, one or more beams for CFRA and one or more additional beams for CBRA, detecting, by the target base station, handover initiation by the UE using the one or more additional beams for CBRA, and releasing, by the target base station, schedule of the one or more beams for CFRA.

In an additional aspect of the disclosure, an apparatus configured for wireless communication includes means for receiving, at a UE, a random access configuration, wherein the random access configuration includes configuration for CFRA and CBRA, means for determining, at the UE, a first random access resource, wherein the first random access resource maps to one or more beams from a target base station, means for determining, by the UE, a beam quality associated with the first random access resource, and means for initiating, by the UE, a random access request using the CBRA when the first random access resource is a contention-free resource, and the beam quality of the first random access resource is below a threshold beam quality.

In an additional aspect of the disclosure, an apparatus configured for wireless communication includes means for receiving, at a UE, a random access configuration, wherein the random access configuration includes configuration for CFRA and CBRA, means for determining, at the UE, a first random access resource, wherein the first random access resource maps to one or more beams from a target base station, means for initiating, by the UE, a random access request using the CFRA when the first random access resource is a contention-free resource, means for failing, by the UE, to detect a random access response to the random access request using the CFRA prior to a predetermined period of time after the means for initiating the random access using the CFRA, and means for initiating, by the UE, CBRA at a next contention-based resource, wherein the next contention-based resource maps to one or more additional beams of the target base station.

In an additional aspect of the disclosure, an apparatus configured for wireless communication includes means for receiving, at a UE, a random access configuration, wherein the random access configuration includes configuration for CFRA and CBRA, means for detecting, at the UE, a first random access resource, wherein the first random access resource maps to one or more beams from a target base station, means for initiating, by the UE, a random access request using the CFRA when the first random access resource is a contention-free resource, and means for initiating, by the UE, the random access request using the CBRA when the first random access resource is a contention-based resource.

In an additional aspect of the disclosure, an apparatus configured for wireless communication includes means for receiving, at a target base station, a random access request from a UE using a CFRA procedure at one or more beams scheduled for CFRA, means for transmitting, by the target base station, a random access response to the UE identifying a delay until an uplink transmission opportunity, means for detecting, by the target base station, a CBRA request from the UE prior to the uplink transmission opportunity, and means for reducing, by the target base station, the delay for a next uplink transmission opportunity using CFRA.

In an additional aspect of the disclosure, an apparatus configured for wireless communication includes means for receiving, at a target base station, a handover request associated with a UE, means for generating, by the target base station, a handover command including a random access configuration, wherein the random access configuration includes configuration for CFRA and CBRA, means for scheduling, by the target base station, one or more beams for CFRA and one or more additional beams for CBRA, means for detecting, by the target base station, handover initiation by the UE using the one or more additional beams for CBRA, and means for releasing, by the target base station, schedule of the one or more beams for CFRA.

In an additional aspect of the disclosure, a non-transitory computer-readable medium having program code recorded thereon. The program code further includes code to receive, at a UE, a random access configuration, wherein the random access configuration includes configuration for CFRA and CBRA, code to determine, at the UE, a first random access resource, wherein the first random access resource maps to one or more beams from a target base station, code to determine, by the UE, a beam quality associated with the first random access resource, and code to initiate, by the UE, a random access request using the CBRA when the first random access resource is a contention-free resource, and the beam quality of the first random access resource is below a threshold beam quality.

In an additional aspect of the disclosure, a non-transitory computer-readable medium having program code recorded thereon. The program code further includes code to receive, at a UE, a random access configuration, wherein the random access configuration includes configuration for CFRA and CBRA, code to determine, at the UE, a first random access resource, wherein the first random access resource maps to one or more beams from a target base station, code to initiate, by the UE, a random access request using the CFRA when the first random access resource is a contention-free resource, code to determine failure, by the UE, to detect a random access response to the random access request using the CFRA prior to a predetermined period of time after execution of the code to initiate the random access using the CFRA, and code to initiate, by the UE, CBRA at a next contention-based resource, wherein the next contention-based resource maps to one or more additional beams of the target base station.

In an additional aspect of the disclosure, a non-transitory computer-readable medium having program code recorded thereon. The program code further includes code to receive, at a UE, a random access configuration, wherein the random access configuration includes configuration for CFRA and CBRA, code to detect, at the UE, a first random access resource, wherein the first random access resource maps to one or more beams from a target base station, code to initiate, by the UE, a random access request using the CFRA when the first random access resource is a contention-free resource, and code to initiate, by the UE, the random access request using the CBRA when the first random access resource is a contention-based resource.

In an additional aspect of the disclosure, a non-transitory computer-readable medium having program code recorded thereon. The program code further includes code to receive, at a target base station, a random access request from a UE using a CFRA procedure at one or more beams scheduled for CFRA, code to transmit, by the target base station, a random access response to the UE identifying a delay until an uplink transmission opportunity, code to detect, by the target base station, a CBRA request from the UE prior to the uplink transmission opportunity, and code to reduce, by the target base station, the delay for a next uplink transmission opportunity using CFRA.

In an additional aspect of the disclosure, a non-transitory computer-readable medium having program code recorded thereon. The program code further includes code to receive, at a target base station, a handover request associated with a UE, code to generate, by the target base station, a handover command including a random access configuration, wherein the random access configuration includes configuration for CFRA and CBRA, code to schedule, by the target base station, one or more beams for CFRA and one or more additional beams for CBRA, code to detect, by the target base station, handover initiation by the UE using the one or more additional beams for CBRA, and code to release, by the target base station, schedule of the one or more beams for CFRA.

In an additional aspect of the disclosure, an apparatus configured for wireless communication is disclosed. The apparatus includes at least one processor, and a memory coupled to the processor. The processor is configured to receive, at a UE, a random access configuration, wherein the random access configuration includes configuration for CFRA and CBRA, to determine, at the UE, a first random access resource, wherein the first random access resource maps to one or more beams from a target base station, to determine, by the UE, a beam quality associated with the first random access resource, and to initiate, by the UE, a random access request using the CBRA when the first random access resource is a contention-free resource, and the beam quality of the first random access resource is below a threshold beam quality.

In an additional aspect of the disclosure, an apparatus configured for wireless communication is disclosed. The apparatus includes at least one processor, and a memory coupled to the processor. The processor is configured to receive, at a UE, a random access configuration, wherein the random access configuration includes configuration for CFRA and CBRA, to determine, at the UE, a first random access resource, wherein the first random access resource maps to one or more beams from a target base station, to initiate, by the UE, a random access request using the CFRA when the first random access resource is a contention-free resource, to determine failure, by the UE, to detect a random access response to the random access request using the CFRA prior to a predetermined period of time after execution of the configuration of the at least one processor to initiate the random access using the CFRA, and to initiate, by the UE, CBRA at a next contention-based resource, wherein the next contention-based resource maps to one or more additional beams of the target base station.

In an additional aspect of the disclosure, an apparatus configured for wireless communication is disclosed. The apparatus includes at least one processor, and a memory coupled to the processor. The processor is configured to receive, at a UE, a random access configuration, wherein the random access configuration includes configuration for CFRA and CBRA, to detect, at the UE, a first random access resource, wherein the first random access resource maps to one or more beams from a target base station, to initiate, by the UE, a random access request using the CFRA when the first random access resource is a contention-free resource, and to initiate, by the UE, the random access request using the CBRA when the first random access resource is a contention-based resource.

In an additional aspect of the disclosure, an apparatus configured for wireless communication is disclosed. The apparatus includes at least one processor, and a memory coupled to the processor. The processor is configured to receive, at a target base station, a random access request from a UE using a CFRA procedure at one or more beams scheduled for CFRA, to transmit, by the target base station, a random access response to the UE identifying a delay until an uplink transmission opportunity, to detect, by the target base station, a CBRA request from the UE prior to the uplink transmission opportunity, and to reduce, by the target base station, the delay for a next uplink transmission opportunity using CFRA.

In an additional aspect of the disclosure, an apparatus configured for wireless communication is disclosed. The apparatus includes at least one processor, and a memory coupled to the processor. The processor is configured to receive, at a target base station, a handover request associated with a UE, to generate, by the target base station, a handover command including a random access configuration, wherein the random access configuration includes configuration for CFRA and CBRA, to schedule, by the target base station, one or more beams for CFRA and one or more additional beams for CBRA, to detect, by the target base station, handover initiation by the UE using the one or more additional beams for CBRA, and to release, by the target base station, schedule of the one or more beams for CFRA.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating example blocks executed to implement one aspect of the present disclosure.

FIG. 7 is a block diagram illustrating example blocks executed to implement one aspect of the present disclosure.

DETAILED DESCRIPTION

Figure 1:
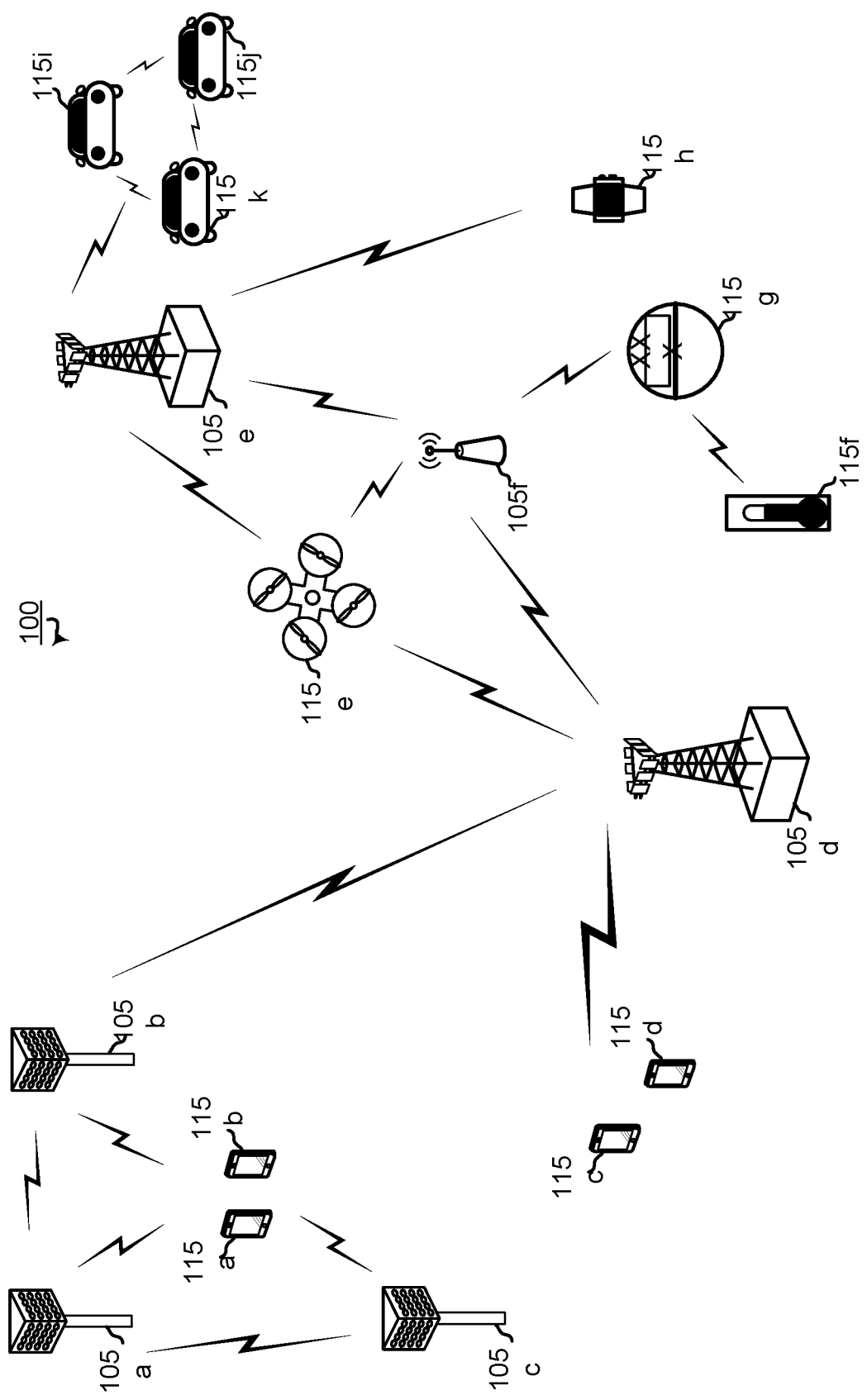
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over $80/100$ MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
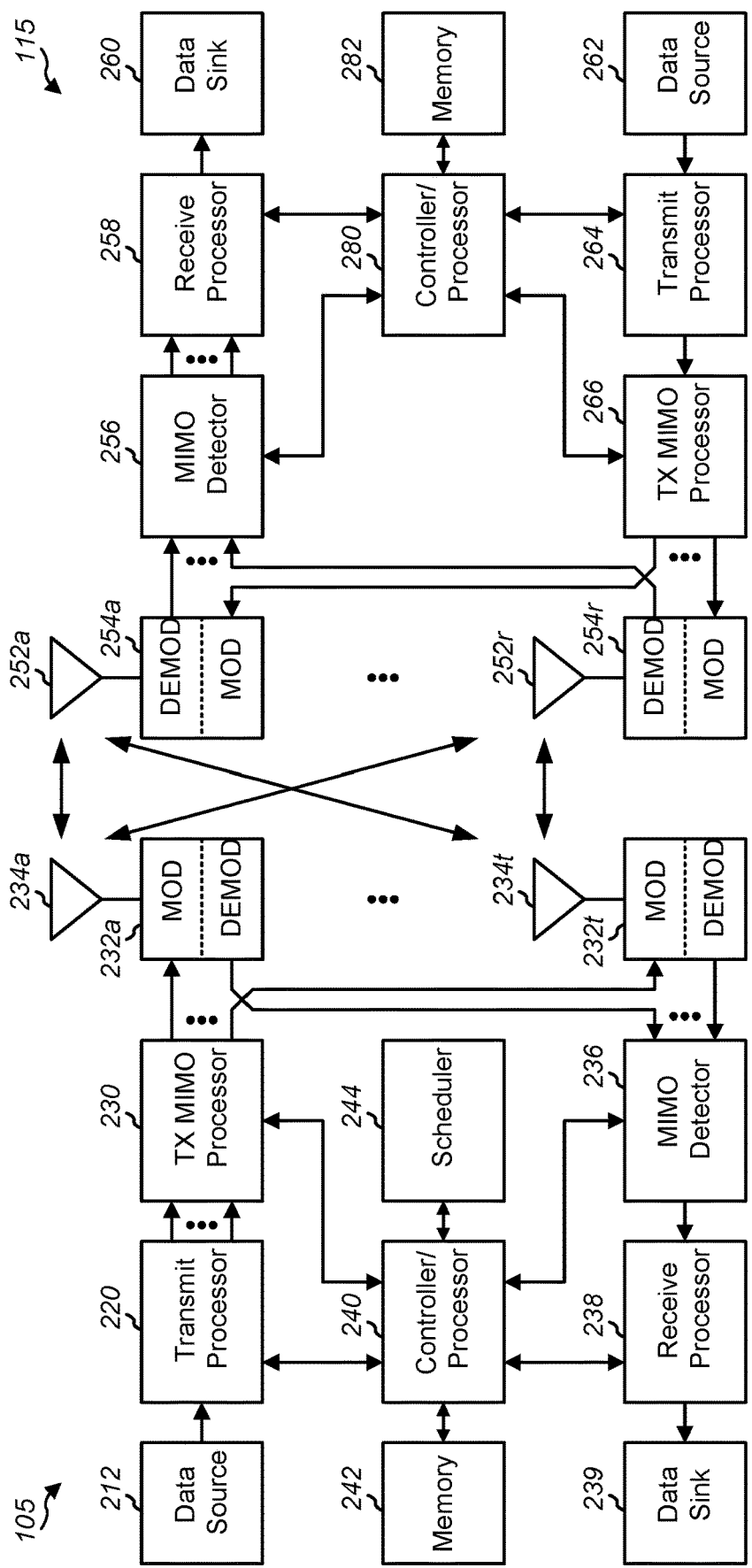
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 6, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
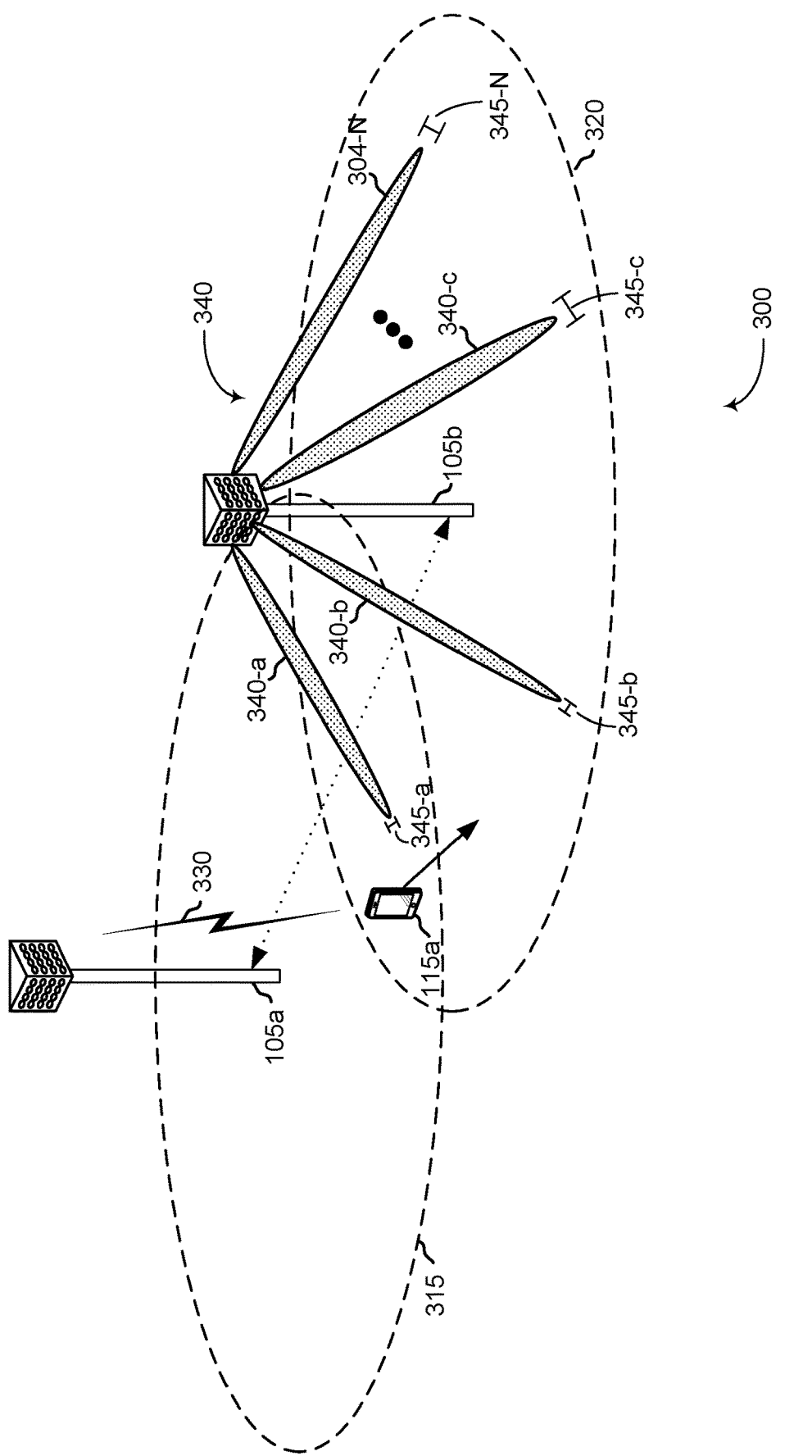
FIG. 3 is a block diagram illustrating a wireless communication system including base stations that use directional wireless beams.

FIG. 3 is a block diagram illustrating a wireless communication system 300 including base stations that use directional wireless beams. The wireless communication system 300 may be an example of the wireless communication system 100 discussed with reference to FIG. 1. The wireless communication system 300 includes a serving base station 105a and a target base station 105b. Coverage areas 315, 320 may be defined for their respective base stations 105a, 105b. The serving base station 105a and the target base station 105b may be examples of the base stations 105 described with reference to FIG. 1. As such, features of the base stations 105a, 105b may be similar to those of the base stations 105.

The serving base station 105a and the target base station 105b may communicate via a backhaul link 325. The backhaul link 325 may be a wired backhaul link or a wireless backhaul link. The backhaul link 325 may be configured to communicate data and other information between the serving base station 105a and the target base station 105b. The backhaul link 325 may be an example of the backhaul links 134 described in reference to FIG. 1.

The serving base station 105a may establish a communication link 330 with a UE 115a. The communication link 330 may be an example of the communication links 125 described with reference to FIG. 1. One characteristic of UEs in a wireless communication system 300 is that the UEs, such as UE 115a may be mobile. Because UEs may change their geophysical location in the wireless communication system 300, to maintain connectivity, UE 115a may desire to terminate its connection with the serving base station 105a and establish a new connection with a target base station 105b. For example, as UE 115a moves, UE 115a may approach the limits of the coverage area 315 of the serving base station 105a. At the same time, however, UE 115a may have passed within the coverage area 320 of the target base station 105b. In some examples, UE 115a may determine its mobility parameter 335 of UE 115a. The mobility parameter 335 may indicate that UE 115a is at a particular location, traveling in a particular direction, at a particular speed, other information related to the mobility of UE 115a, or any combination thereof. When UE 115a approaches the limits of the coverage area 315 of the serving base station 105a, a handover procedure of UE 115a between the serving base station 105a and the target base station 105b may be initiated.

In some examples of new radio (NR), the target base station 105b may communicate with UE 115a via directional wireless communication links 340 (sometimes referred to as directional wireless beams or directional beams). The directional wireless communication links 340 may be pointed in a specific direction and provide high-bandwidth links between the target base station 105b and UE 115a. Signal processing techniques, such as beamforming, may be used to coherently combine energy and thereby form the directional wireless communication links 340. Wireless communication links achieved through beamforming may be associated with narrow beams (e.g., "pencil beams") that are highly directional, minimize inter-link interference, and provide high-bandwidth links between wireless nodes (e.g., base stations, access nodes, UEs etc.). In some examples, the target base station 310 may operate in millimeter wave (mmWave) frequency ranges, e.g., 28 GHz, 40 GHz, 60 GHz, etc. In some examples, the directional wireless communication links 340 are transmitted using frequencies greater than 6 GHz. Wireless communication at these frequencies may be associated with increased signal attenuation, e.g., path loss, which may be influenced by various factors, such as temperature, barometric pressure, diffraction, etc. Dynamic beam-steering and beam-search capabilities may further support, for example, discovery, link establishment, and beam refinement in the presence of dynamic shadowing and Rayleigh fading. Additionally, communication in such mmWave systems may be time division multiplexed, where a transmission may only be directed to one wireless device at a time due to the directionality of the transmitted signal.

Each directional wireless communication link 340 may have a beam width 345. The beam width 345 for each directional wireless communication link 340 may be different (e.g., compare the beam width 345-a of the directional wireless communication link 340-a to the beam width 345-c of the directional wireless communication link 340-c). The beam width 345 may related to the size of the phased array antenna used to generate the directional wireless communication link 340. Different beam widths 345 may be used by the target base station 310 in different scenarios. For example, a first message may transmitted/received using a directional wireless beam having a first beam width, while a second message may be transmitted/received using a directional wireless beam having a second beam width different than the first beam width. The target base station 105b may generate any number of directional wireless communication links 340 (e.g., directional wireless communication link 340-N). The directional wireless communication links 340 generated by the target base station 105b may be pointed at any geographic location.

As UE 115a moves in the wireless communication system 300, UE 115a may move out of the effective range of a particular directional wireless communication link (see, e.g., directional wireless communication link 340-a). Because of the narrow-beam width 345 of the directional wireless communication links 340, the directional wireless communication links 340 may provide coverage to a small geographic area. In contrast, an omni-directional wireless communications link radiates energy in all directions and covers a wide geographic area.

When a target base station 105b uses directional wireless communication links 340 to establish a communication link with UE 115a, it may further complicate a handover procedure. In some examples, the handover procedure discussed herein is a non-contention handover procedure. Control messages exchanged during a handover procedure may have latency between transmission and receipt. As such, there may be a delay of time between when a target base station 105b assigns resources to UE 115a and when UE 115a may execute an operation using those assigned resources. In some examples, the handover procedure may have a latency that spans a few tens to hundreds of milli-seconds. Due to UE mobility, rotation, or signal blockage, channel characteristics of a directional wireless communication link 340 may change over time. In particular, the channel characteristics of an assigned directional wireless communication link 340 may change during the delays of the handover procedure. If a single resource (e.g., a single directional wireless communication link 340) is assigned during a handover procedure, the handover procedure may fail due to insufficient signal later in the process. Accordingly, handover procedures may be adjusted to account for multiple directional wireless beams that may be used to establish a communication link between the target base station 105b and UE 115a during a handover procedure.

One of the unique challenges in mmWave systems is accommodating the high path loss that results with the multiple narrow beams. One suggested operation to address such high path loss revolves around techniques such as hybrid beamforming (e.g., hybrid between analog and digital beamforming), which has generally not been implemented with regard to 3G and 4G communication systems. Hybrid beamforming creates a narrow beam pattern directed to users that can enhance the link budget/SNR.

In connected mode handovers, the base station triggers the handover procedure based on various radio conditions. The base station may configure the UEs to perform measurement reporting on which the handover determinations are made. Before sending the handover message to the UE, however the source base station prepares one or more target base stations for the handover. After receiving the request for handover from the source base station, the target base station generates the handover command with a connection reconfiguration message having mobility control information included that will be used to perform the handover. The target base station transmits the generated handover command to the source base station which then forwards the handover command to the UE. The handover command can contain at least the cell identity of the target cell along with the random access (e.g., RACH) configuration associated to the beams of the target cell. The RACH configuration can include configuration for contention-free random access (CFRA), in which no LBT procedures are used before attempting random access to the target base station, or contention-based random access (CBRA), in which the UE will first perform an LBT procedure to secure the channel before attempting random access to the target base station. A set of resources mapped to multiple narrow beams are scheduled by the target base station for both CFRA and CBRA. Once the UE receives the handover command forwarded by the source base station, the UE will perform CBRA on the beam resources selected by the UE if the CFRA resources are not provided for the UE's beam selection. Upon successful completion of the handover, the UE will send a confirmation message.

One drawback to this procedure is that the CFRA resources provided by the base station may not be optimal for one or more of the UEs. For example the base station may allocate CFRA resources, but such CFRA resources are scheduled occur after the CBRA resources. Waiting for CFRA resources to perform random access when CBRA resources are available first is inefficient and may add additional delay. Moreover, by the time the UE reaches the scheduled time for random access on the CFRA resources, the CFRA resources (beam information) may or may not still be valid. Any failure to find a suitable beam of the target cell during random access results in a fallback to CBRA, which will cause even further delay.

Various aspects of the present disclosure provide for configuration for both CFRA and CBRA be included in the RACH configuration message, in which, the UE selects to perform either or both of CFRA and CBRA depending, at least in part, on which resources are scheduled first.

Figure 4:
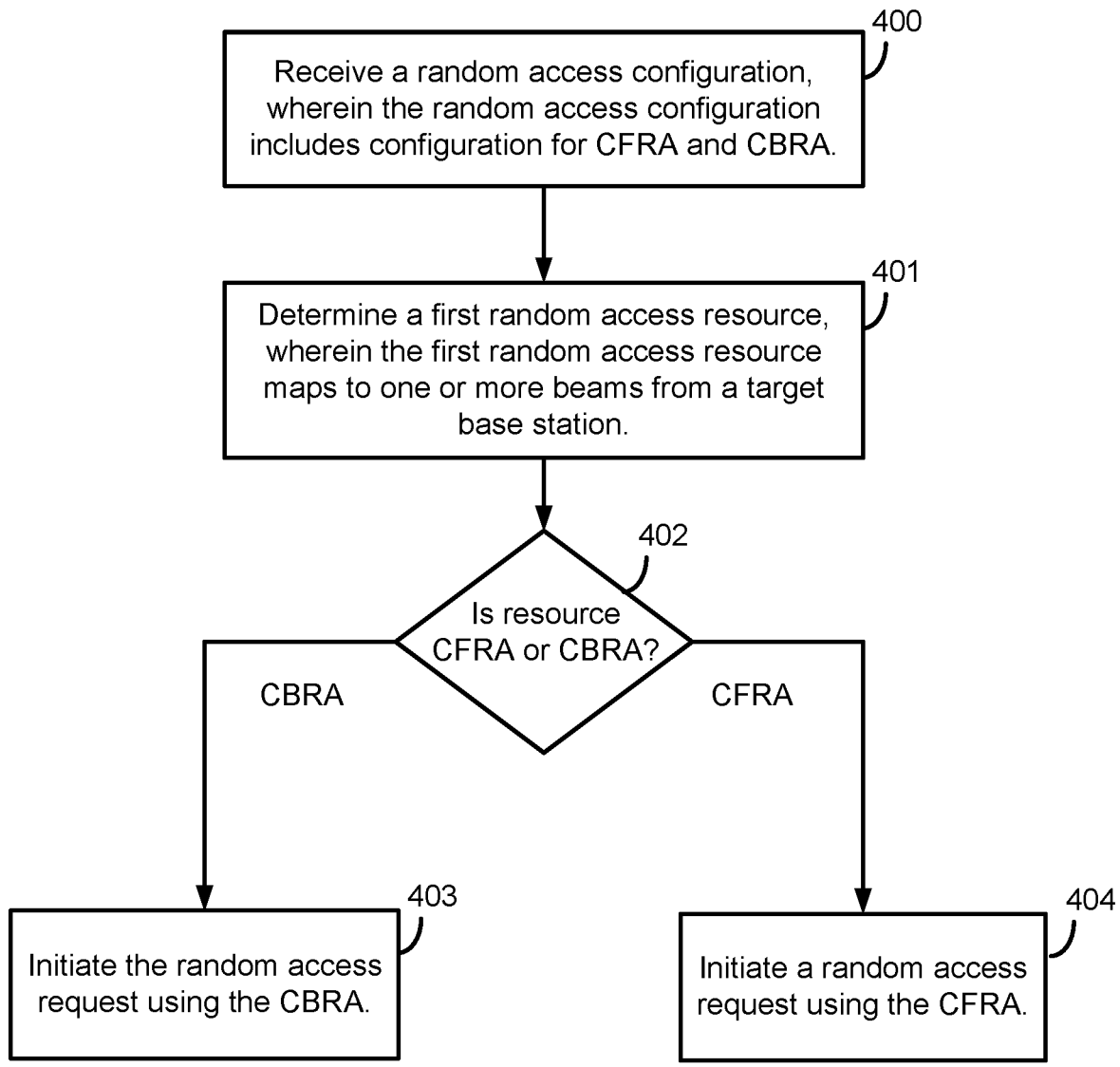
FIG. 4 is a block diagram illustrating example blocks executed to implement one aspect of the present disclosure.
Figure 8:
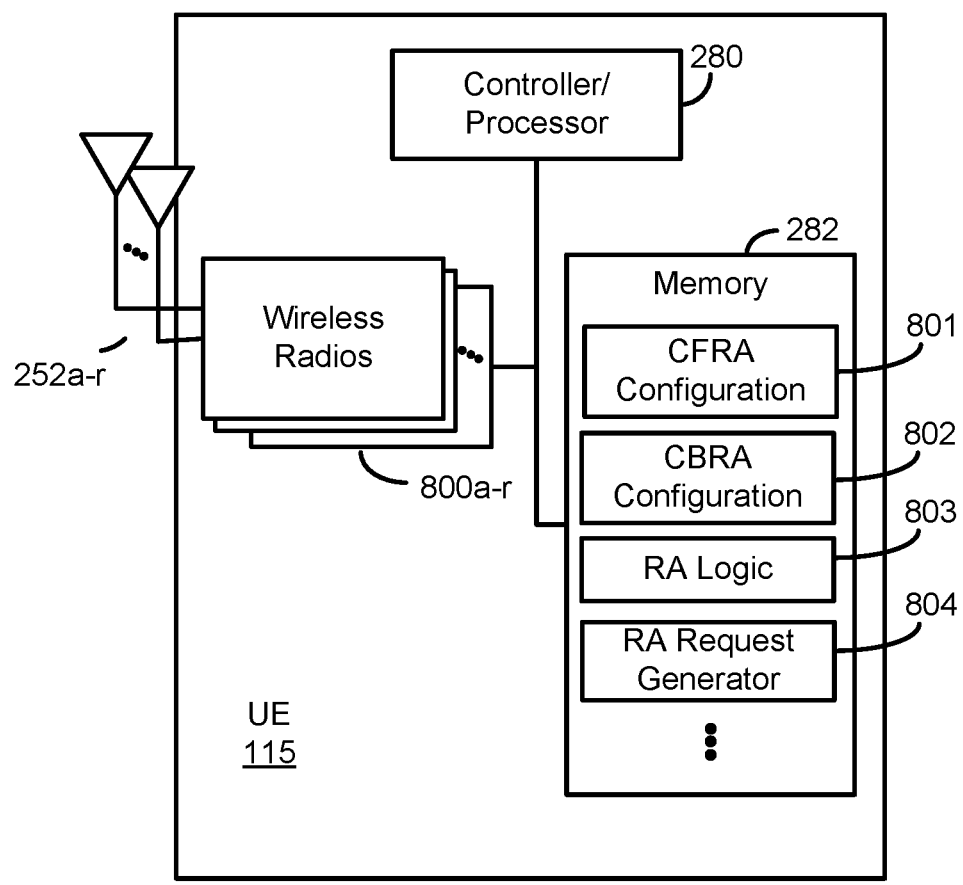
FIG. 8 is a block diagram illustrating an example UE configured according to one aspect of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE receives a random access configuration wherein the random access configuration includes configuration for both CFRA and CBRA. For example, UE 115, under control of controller/processor 280, receives signals via antennas 252a-r and wireless radios 800a-r. The signals are demodulated and decoded through the components of wireless radios 800a-r and identified as a random access request. The random access configuration will likely be received by UE 115 from the source base station after having been generated by one of the target base stations and transmitted from the target base station to the source for forwarding. UE 115 will then store the configuration in memory 282 at CFRA configuration 801 and CBRA configuration 802.

At block 401, the UE determines a first random access resource, wherein the first random access resource maps to one or more beams from a target base station. When UE 115 determines to perform a random access, it will execute, under control of controller/processor 280, RA logic 803, stored in memory 282. The execution environment of RA logic 803 allows for UE 115 to keep track of the different resource assignments included in the random access configuration received before. The target base station configures and schedules a set of narrow beams as the random access resources for the CFRA and the CBRA. The different sets of random access resources will be scheduled at different times. Thus, UE 115 will monitor and detect for the first set of random access resources.

At block 402, a determination is made whether the first random access resources are CFRA resources or CBRA resources. The execution environment of RA logic 803 checks the resource assignment information at CFRA configuration 801 and CBRA configuration 802 to determine which resources have occurred first. If UE 115 detects CBRA resources, then, at block 403, the UE will initiate the random access request using the CBRA procedure. When the determination is made that the CBRA resources have occurred first, UE 115, under control of controller/processor 280, will execute RA request generator 804, in order to generate a random access request to transmit using the CBRA resources via wireless radios 800a-r and antennas 252a-r. If, however, the UE detects CFRA resources, then, at block 404, the UE will initiate the random access request using the CFRA procedure. Similarly, if the CFRA resources are detected first, the execution environment of RA request generator 804 will cause the generated random access request to be made using the CFRA resources via wireless radios 800a-r and antennas 252a-r. Depending on which random access resources are schedule first, UE 115 will select the corresponding random access procedure (CBRA vs. CFRA) in order to efficiently begin random access at the earliest opportunity.

The various aspects of the present disclosure provide for the handover command to contain RACH configuration(s) associated to the beams of the target cell. RACH configuration(s) can include configuration both CBRA and CFRA. The resources for CBRA and CFRA may be mapped to existing beams of the target base station, such as channel state information (CSI) reference signals (CSI-RS) or new radio (NR) shared spectrum (NR-SS) beams. After receiving the RACH configuration for handover execution, a UE may initiate RACH using CFRA, either (1) if CFRA occurs prior to CBRA or (2) the beam quality of CFRA is determined to be above a particular quality threshold (e.g., downlink signal quality above a threshold, uplink transmit power below a threshold, or a quality that is a threshold level better than the beams scheduled for CBRA resources). After receiving the random access response from the target base station, the UE will continue to set up connection via CFRA.

While the UE may initially select to perform CFRA when one of these conditions is met, if the target base station fails to respond or the UE fails to receive the response, then the UE would re-initiate RACH using a suitable beam (resources) of CBRA. Thus, if a delay period is exceeded or the UE simply does not receive the response as expected, the UE will fall back to performing random access using CBRA.

The UE will, instead initiate RACH using CBRA, (1) if CBRA occurs prior to CFRA or (2) beam quality of CFRA is determined to be poor (e.g., below a threshold provided by base station or the UE computed transmit power for the random access request is above a threshold).

Figure 5:
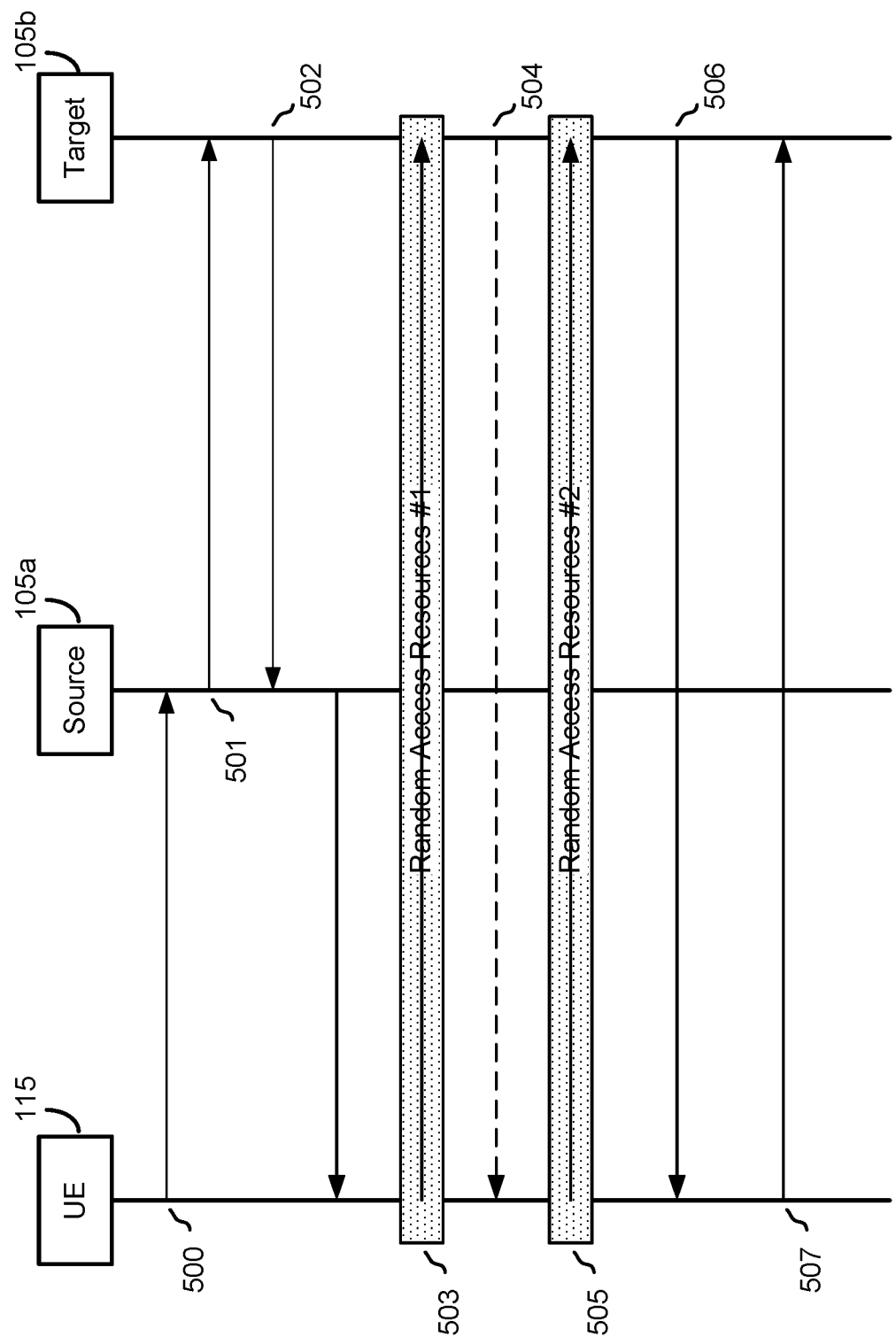
FIG. 5 is a block diagram illustrating a UE, a source base station, and a target base station configured according to one aspect of the present disclosure.

FIG. 5 is a block diagram illustrating a UE 115, a source base station 105a, and a target base station 105b configured according to one aspect of the present disclosure. Source base station 105a has configured UE 115 to perform measurement reporting for channel conditions. At 500, UE 115 transmits a measurement report to source base station 105a. Based on the measurement report, source base station 105a determines to handover UE 115 to target base station 105b.

At 501, source base station 105a transmits a handover request to target base station 105b. Target base station 105b prepares a handover command for UE 115 that includes a random access configuration that provides for both CBRA and CFRA. Target base station 105b also assigns and schedules random access resources for both CBRA and CFRA for UE 115 to use in the random access procedure. At 502, target base station 105b sends the handover command to source base station 105a, which forwards the handover command to UE 115.

In one example illustrated by FIG. 5, UE 115 detects random access resources #1 to be associated with CFRA. In such a scenario, UE 115 will begin the random access process using CFRA, at 503. In the presently described example, no response message is sent by target base station 105b at 504. Without having received a response message, UE 115 falls back to re-initiating random access using CBRA at 505 using random access resources #2. Target base station 105b responds with a handover response message at 506 and UE 115 begins establishing connection at 507.

In another example illustrated by FIG. 5, instead of random access resources #1 being CFRA, UE 115 determines that it is CBRA and initiates the random access request at 503 using CBRA. In this example, target base station 105b responds to the random access request at 504 and connections is established without further random access request at 505.

In another example illustrated by FIG. 5, in configuring UE 115 in the handover command. UE 115 is configured to perform CFRA and CBRA together on one or more of the corresponding beams of the target cell. In such example implementation, UE 115 sends a random access request at 503 on random access resources #1, with either CFRA or CBRA depending on the configuration of random access resources #1, and a random access request at 505 on random access resources #2, with the other of CBRA or CFRA.

It should be noted that, in an alternative aspect, if the base station determines that a UE has used CBRA during handover execution, then the base station may release the resources allocated for CFRA.

Figure 9:
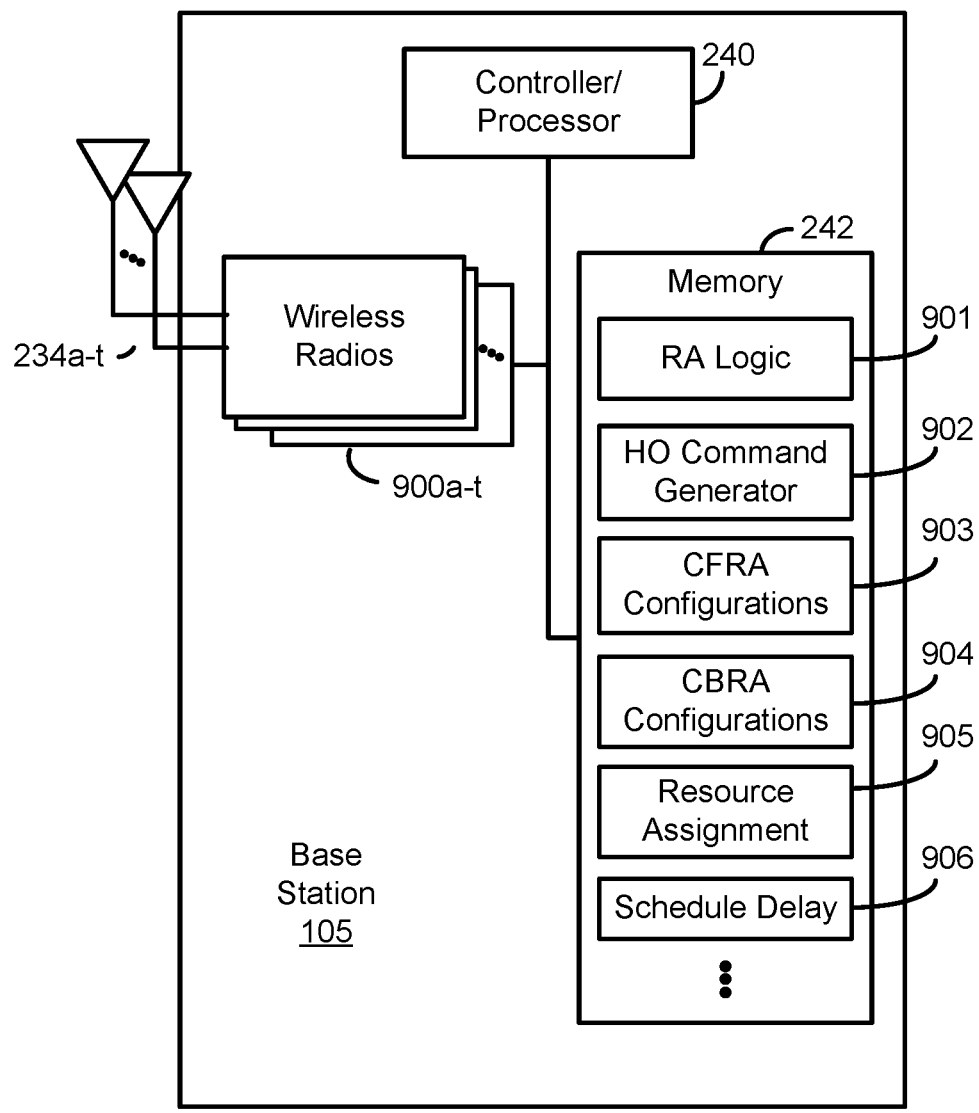
FIG. 9 is a block diagram illustrating an example base station configured according to one aspect of the present disclosure.

FIG. 6 is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-t and antennas 234a-t. Wireless radios 900a-t includes various components and hardware, as illustrated in FIG. 2 for base station 105, including modulator/demodulators 232a-t, MIMO detector 236, receive processor 238, transmit processor 220, and TX MIMO processor 230.

At block 600, a target base station receives a random access request from a UE using a CFRA procedure at one or more beams scheduled for CFRA. For example, base station 105, under control of controller/processor 240, receives signals via antennas 234a-t and wireless radios 900a-t. The signals are demodulated and decoded through the components of wireless radios 900a-t and identified as a random access request. At block 601, the target base station transmits a random access response message to the UE identifying a delay until an uplink transmission opportunity. In response to the random access request, base station 105, under control of controller/processor 240, executes random access (RA) logic 901, stored in memory 242. The execution environment of RA logic 901 provides for base station 105 to generated a random access response message. The random access response message will include a delay, identified from schedule delay logic 906, stored in memory 242, which provides the schedule timing for uplink transmission of the served UE. The next available opportunity for the target base station to schedule an uplink transmission for the UE is delayed beyond the scheduled CBRA resources in this example scenario.

At block 602, the target base station detects a CBRA random access request from the UE prior to the uplink transmission opportunity. While the UE and the target base station, base station 105, have begun establishing connection using CFRA, because of the delay in scheduling the CFRA uplink transmission opportunity the UE has opted to re-initiated random access using CBRA in order to attempt an earlier transmission opportunity. At block 603, the target base station reduces the delay for a next uplink opportunity using CFRA. In response to detecting the UE attempting to transmit using CBRA when the connection establishment was initially begun with CFRA, the target base station, base station 105, may realize that its delay in scheduling may be too long. Base station 105 may then use this information to reduce the delay in schedule delay logic 906 for the next scheduling of CFRA-based transmissions. Thus, in subsequent CFRA attempts, base station 105 may lessen the delay and maintain CFRA connection establishment.

FIG. 7 is a block diagram illustrating example blocks executed to implement one aspect of the present disclosure. The example blocks will also be described with respect to base station 105 as illustrated in FIG. 9. At block 700, a target base station receives a handover request associated with a particular UE from a source base station. Similar to the functionality described above, base station 105, under control of controller/processor 240, receives the handover request from the source base station via antennas 234a-t and wireless radios 900a-t. As the source base stations determine that a particular UE should be handed over, it will send out handover requests to one or more potential target base stations.

At block 701, the target base station generates a handover command with a random access configuration that includes configuration for both CFRA and CBRA procedures. For example, base station 105, under control of controller/processor 240, executes RA logic 901, stored in memory 242. The execution environment of RA logic 901 triggers base station 105 to generate a handover command by executing HO command generator 902, stored in memory 242. The execution environment of HO command generator 902 generates a handover message that includes configurations for both CFRA and CBRA, selected from CFRA configurations 903 and CBRA configurations 904, stored in memory 242.

At block 702, the target base station schedules one or more beams as resources for the CFRA and one or more additional beams as resources for the CBRA. When a target base station, base station 105, prepares for handover for a UE, the handover command generated according to aspects of the present disclosure include configuration for both CFRA and CBRA and will include and assignment and scheduling of beam resources of the target base station to accommodate the random access procedures of both CFRA and CBRA. For example, the execution environments of RA logic 901 and HO command generator 902 trigger execution, under control of controller/processor 240, of resource assignment logic 905. The execution environment of resource assignment logic 905 schedules sets of beams as resources for CFRA and other sets of beams as resources for CBRA.

At block 703, the target base station detects handover initiation by the UE using the one or more additional beams for CBRA. For example, base station 105 receives handover initiation messages via antennas 234*a-t* and wireless radios 900*a-t*, and detects, under control of controller/processor 240, and the execution environment of RA logic 901, that the handover initiation messages have been received via the CBRA resources. At block 704, the target base station releases the scheduled beams of resources for CFRA. After generating the handover command and scheduling resources for both CFRA and CBRA, when the target base station, base station 105, then detects the UE attempting random access using CBRA, it may release the assigned resources for CFRA. The execution environment of RA logic 901 recognizes that handover is being established using the CBRA resources and, in order to conserve resources at base station 105, releases the set of beams assigned for CFRA.

It should be noted that, in alternative aspects, a target base station may similarly release the assigned resources for CBRA when random access initiation is detected from the UE using the CFRA resources. In such alternative aspects, the target base station may wait to release the CFRA resources for a predetermined threshold period. This delay period would allow more time for the UE to establish connection using the CBRA, in case the UE would be required to fallback to attempting random access with CBRA. Such a delay period may also be applied to the previous example scenario, where the delay is instituted after detecting random access initiation using CBRA resources.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 6, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), a configuration for contention-free random access (CFRA) and a configuration for contention-based random access (CBRA);
   determining, at the UE, a first random access resource, wherein the first random access resource maps to one or more beams from a target base station;
   determining, by the UE, a beam quality associated with the first random access resource;
   initiating, by the UE, a random access request using the CFRA when the first random access resource is a contention-free resource, and the beam quality of the first random access resource is above a threshold beam quality; and
   initiating, by the UE, the random access request using the CBRA when the first random access resource is the contention-free resource, and the beam quality of the first random access resource is below the threshold beam quality.

2. The method of claim 1, further comprising:
   determining that the first random access resource is the contention-free resource;
   determining that the beam quality of the first random access resource is above the threshold beam quality; and
   initiating, by the UE, the random access request using the CFRA based on the determination that the first random access resource is the contention-free resource and that the beam quality of the first random access resource is above the threshold beam quality.

3. The method of claim 1, further comprising:
   determining that the first random access resource is the contention-free resource;
   determining that the beam quality of the first random access resource is below the threshold beam quality; and
   initiating, by the UE, the random access request using the CBRA based on the determination that the first random access resource is the contention-free resource and that the beam quality of the first random access resource is below the threshold beam quality.

4. The method of claim 1, wherein the threshold beam quality is a threshold provided to the UE by a base station.

5. The method of claim 1, wherein the one or more beams from the target base station comprise channel state information reference signals (CSI-RS).

6. The method of claim 1, further comprising:
   receiving, at the UE, a random access response to the random access request using the CFRA, wherein the random access response identifies a next uplink transmission opportunity located after a next contention-based resource, wherein the next contention-based resource maps to one or more additional beams of the target base station; and
   initiating, by the UE, CBRA at the next contention-based resource.

7. The method of claim 1, further comprising:
   failing, by the UE, to detect a random access response to the random access request using the CFRA prior to a predetermined period of time after the initiating the random access request using the CFRA; and
   initiating, by the UE, CBRA at a next contention-based resource, wherein the next contention-based resource maps to one or more additional beams of the target base station.

8. The method of claim 1, further comprising one of:
   initiating, by the UE, another random access request using the CBRA at contention-based random access resources in addition to the initiating the random access request using the CFRA; or
   initiating, by the UE, the another random access request using the CFRA at contention-free random access resources in addition to the initiating the random access request using the CBRA.

9. The method of claim 1, further comprising receiving, at the UE, a random access configuration that includes identification for the UE to perform one of:
   the initiating the random access request using the CFRA;
   the initiating the random access request using the CBRA; or
   initiating the random access request using both the CFRA and the CBRA.

10. The method of claim 1, further comprising receiving, at the UE, a random access configuration that includes identification for the UE to perform, according to a predetermined priority, one of:
    the initiating the random access request using the CFRA;
    the initiating the random access request using the CBRA; or
    initiating the random access request using both the CFRA and the CBRA.

11. An apparatus for wireless communication, the apparatus comprising:
    at least one processor; and
    a memory coupled with the at least one processor, wherein the at least one processor is configured to:

receive, at a user equipment (UE), a configuration for contention-free random access (CFRA) and a configuration for contention-based random access (CBRA);

determine, at the UE, a first random access resource, wherein the first random access resource maps to one or more beams from a target base station;

determine, by the UE, a beam quality associated with the first random access resource;

initiate, by the UE, a random access request using the CFRA when the first random access resource is a contention-free resource, and the beam quality of the first random access resource is above a threshold beam quality; and initiate, by the UE, the random access request using the CBRA when the first random access resource is the contention-free resource, and the beam quality of the first random access resource is below the threshold beam quality.

12. The apparatus of claim 11, wherein the at least one processor is configured to:
    determine that the first random access resource is the contention-free resource;
    determine that the beam quality of the first random access resource is above the threshold beam quality; and
    initiate, by the UE, the random access request using the CFRA based on the determination that the first random access resource is the contention-free resource and that the beam quality of the first random access resource is above the threshold beam quality.

13. The apparatus of claim 11, wherein the at least one processor is configured to:
    determine that the first random access resource is the contention-free resource;
    determine that the beam quality of the first random access resource is below the threshold beam quality; and
    initiate, by the UE, the random access request using the CBRA based on the determination that the first random access resource is the contention-free resource and that the beam quality of the first random access resource is below the threshold beam quality.

14. The apparatus of claim 11, wherein the threshold beam quality is a threshold provided to the UE by a base station.

15. The apparatus of claim 11, wherein the one or more beams from the target base station comprise channel state information reference signals (CSI-RS).

16. The apparatus of claim 11, wherein the at least one processor is configured to:
    receive, at the UE, a random access response to the random access request using the CFRA, wherein the random access response identifies a next uplink transmission opportunity located after a next contention-based resource, wherein the next contention-based resource maps to one or more additional beams of the target base station; and
    initiate, by the UE, CBRA at the next contention-based resource.

17. The apparatus of claim 11, wherein the at least one processor is configured to:
    fail, by the UE, to detect a random access response to the random access request using the CFRA prior to a predetermined period of time after the random access request using the CFRA; and
    initiate, by the UE, CBRA at a next contention-based resource, wherein the next contention-based resource maps to one or more additional beams of the target base station.

18. The apparatus of claim 11, wherein the at least one processor is configured to:
    initiate, by the UE, another random access request using the CBRA at contention-based random access resources in addition to the random access request using the CFRA; or
    initiate, by the UE, the another random access request using the CFRA at contention-free random access resources in addition to the random access request using the CBRA.

19. The apparatus of claim 11, wherein the at least one processor is configured to receive, at the UE, a random access configuration that includes identification for the UE to perform one of:
    the random access request using the CFRA;
    the random access request using the CBRA; or
    the random access request using both the CFRA and the CBRA.

20. The apparatus of claim 11, wherein the at least one processor is configured to receive, at the UE, a random access configuration that includes identification for the UE to perform, according to a predetermined priority, one of:
    the random access request using the CFRA;
    the random access request using the CBRA; or
    the random access request using both the CFRA and the CBRA.

21. An apparatus for wireless communication, the apparatus comprising:
    means for receiving, at a user equipment (UE), a configuration for contention-free random access (CFRA) and a configuration for contention-based random access (CBRA);
    means for determining, at the UE, a first random access resource, wherein the first random access resource maps to one or more beams from a target base station;
    means for determining, by the UE, a beam quality associated with the first random access resource;
    means for initiating, by the UE, a random access request using the CFRA when the first random access resource is a contention-free resource, and the beam quality of the first random access resource is above a threshold beam quality; and
    means for initiating, by the UE, the random access request using the CBRA when the first random access resource is the contention-free resource, and the beam quality of the first random access resource is below the threshold beam quality.

* * * * *